United States Patent
John et al.

(10) Patent No.: US 8,000,815 B2
(45) Date of Patent: Aug. 16, 2011

(54) METHOD FOR THE SUPPLYING AND INSTALLATION OF DEVICE-SPECIFIC FUNCTIONALITIES AND/OR DATA FOR THE FIELD DEVICES OF A DISTRIBUTED SYSTEM

(75) Inventors: Dirk John, Karlsruhe (DE); Marco Fahl, Schriesheim (DE); Peter Wendt, Gardsen (DE); Achim Laubenstein, Löhne (DE); Tom Mueller, Fort Collins, CO (US)

(73) Assignee: ABB Research Ltd, Zurich (CH)

( * ) Notice: Subject to any disclaimer, the term of this patent is extended or adjusted under 35 U.S.C. 154(b) by 284 days.

(21) Appl. No.: 10/581,208

(22) PCT Filed: Dec. 3, 2004

(86) PCT No.: PCT/EP2004/013749
§ 371 (c)(1),
(2), (4) Date: May 23, 2007

(87) PCT Pub. No.: WO2005/054965
PCT Pub. Date: Jun. 16, 2005

(65) Prior Publication Data
US 2007/0244584 A1 Oct. 18, 2007

(30) Foreign Application Priority Data
Dec. 5, 2003 (DE) ................................ 103 57 276

(51) Int. Cl.
*G05B 11/01* (2006.01)
(52) U.S. Cl. .................. 700/18; 700/17; 700/9; 713/1; 709/221

(58) Field of Classification Search .................. 700/1, 9, 700/17, 18; 709/221, 222; 713/1
See application file for complete search history.

(56) References Cited

U.S. PATENT DOCUMENTS

| | | | | |
|---|---|---|---|---|
| 5,801,942 A | * | 9/1998 | Nixon et al. | 700/83 |
| 5,862,052 A | * | 1/1999 | Nixon et al. | 713/1 |
| 5,980,078 A | * | 11/1999 | Krivoshein et al. | 700/1 |
| 6,195,591 B1 | * | 2/2001 | Nixon et al. | 700/83 |
| 6,424,872 B1 | * | 7/2002 | Glanzer et al. | 700/18 |
| 6,446,202 B1 | * | 9/2002 | Krivoshein et al. | 713/1 |

(Continued)

FOREIGN PATENT DOCUMENTS

DE 299 08 319 U1 8/2000

(Continued)

OTHER PUBLICATIONS

International Preliminary Report on Patentability for PCT/EP2004/013749 and English Translation of the Written Opinion of the International Searching Authority for PCT/EP2004/013749.
German Search Report.

*Primary Examiner* — Albert Decady
*Assistant Examiner* — Douglas S Lee
(74) *Attorney, Agent, or Firm* — Buchanan Ingersoll & Rooney PC

(57) ABSTRACT

The invention relates to an arrangement and a method for the directed supplying and installation of device specific functionalities and/or data for field devices that are disposed in a distributed system. At least one device-specific component is provided which cooperates with at least two functional units that are linked thereto. Said at least one device-specific component comprises means that automatically cause device-specific functionalities and/or data for the field devices, which are stored in the functional units, to be supplied and installed.

29 Claims, 4 Drawing Sheets

U.S. PATENT DOCUMENTS

| | | | |
|---|---|---|---|
| 6,594,530 B1 * | 7/2003 | Glanzer et al. | 700/18 |
| 6,963,814 B2 * | 11/2005 | Jones et al. | 702/119 |
| 6,999,824 B2 * | 2/2006 | Glanzer et al. | 700/18 |
| 7,167,762 B2 * | 1/2007 | Glanzer et al. | 700/79 |
| 2003/0149493 A1 | 8/2003 | Blevins et al. | |
| 2003/0154144 A1 | 8/2003 | Pokorny et al. | |

FOREIGN PATENT DOCUMENTS

| | | |
|---|---|---|
| DE | 100 49 025 A1 | 6/2001 |
| DE | 102 14 553 A1 | 10/2003 |
| EP | 1 199 846 A1 | 4/2002 |
| WO | WO 02/054162 A2 | 7/2002 |

* cited by examiner

METHOD FOR THE SUPPLYING AND INSTALLATION OF DEVICE-SPECIFIC FUNCTIONALITIES AND/OR DATA FOR THE FIELD DEVICES OF A DISTRIBUTED SYSTEM

FIELD

The invention relates to a system and a method for directed provision and installation of device-specific functionalities and/or information for field devices which are arranged in a distributed system, in particular in a distributed automation system.

BACKGROUND

The structure of a distributed system comprises a large number of field devices, which communicate via a network structure, for example via a bus system, with one another and/or with a higher-level control system or controller. Examples of field devices which are used in distributed systems are drives, motor protection units, switchgear assemblies, sensors, in particular sensors for pressure, temperature and flow measurements, low-voltage devices, actuators and/or analysis devices.

Device information for the field devices in the distributed system, such as device documentation, device core data and device parameters, is stored.

The functions of the field devices are not just restricted to passing on measurement data or fault messages. The field devices are increasingly being extended with additional functionalities for the configuration, engineering and diagnosis of an automation system, for example with control functions, setting-up functions, diagnosis functions, maintenance functions, optimization functions, alarm processing functions and/or life functions, in which case the additional functionalities must also be integrated separately in each field device.

A large number of applications for control, for preventative maintenance and for status recording of the distributed system, which are also known as asset optimization (installation optimization), are also closely related to the field devices and must be installed for the field devices.

In order to provide the functionality and all of the descriptions which are associated with it and are accessed by a field device over the entire life cycle in the distributed system, complex installation and configuration processes are required for the device-specific functionalities and/or information for the field devices, since the device-specific functionalities and/or information are/is provided separately for each field device and are transmitted to the distributed system.

A further disadvantage is that the device-specific functionalities and/or information for the field devices and the components associated with them are integrated individually in the distributed system. This process is highly time-consuming and is associated with considerable technical effort, thus in particular considerably increasing the setting-up effort.

Components which are necessary in order to address a relevant field device and use it in a given network do not yet exist on the basis of the procedure described above, but are dependent on further configuration and setting-up steps. These components differ, depending on the communication architecture that is used. Fieldbus systems such as FOUNDATION fieldbus, PROFIBUS, PROFINet and/or HART are suitable protocols for communication between the field devices and the higher-level control system or controller. Linking devices (couplers) may represent the corresponding component for the FOUNDATION fieldbus. Corresponding components are provided by remote-I/Os (remote input and output units) for the PROFIBUS.

SUMMARY

The invention is accordingly based on the object of providing an arrangement for directed provision and installation of device-specific functionalities and/or information for field devices which are arranged in a distributed system, in particular in a distributed automation system, thus avoiding the disadvantages and problems mentioned above.

According to the invention, this object is achieved by an arrangement having the features specified in claim 1. A corresponding method for implementation of the arrangement according to the invention is specified in claim 17.

Advantageous refinements and improvements of the apparatus according to the invention are specified in further claims and in the description.

The arrangement according to the invention for directed provision and installation of device-specific functionalities and/or information for field devices which are arranged in a distributed system comprises at least one device-specific component which interacts with at least two functional units which are linked to it, and in which means are provided at least in one device-specific component which automatically results in provision and installation of device-specific functionalities, which are stored in the functional units, and/or information in the field devices.

The device-specific components relate in particular to device-specific information for drives, switchgear assemblies, instrumentation for positioning states, pressure, temperature and/or flow rate measurements and low-voltage switching devices as well as functionalities of the field devices which relate to the overall life cycle of the devices. The device-specific components also relate to information and functionalities. For the planning and configuration which are stored in documentation, device descriptions and/or device drivers, for setting up, which is stored in additional network components, for operation, which is stored as display elements and documentation, for the diagnosis displays, for linking to maintenance management and for real-time displays of alarm, status and/or event messages, in particular with reference to asset management (installation management).

The device-specific functionalities and/or information which interact/s with the device-specific components are/is recorded as data structures and/or program components in the device-specific components, such that each component comprises only functionalities and/or information for the device type associated with it. The arrangement according to the invention also has a plurality of device-specific components which each relate to different device types, and is preferably stored in a memory medium.

The functional units are used in particular to store device information, such as device documentation and/or device core data and/or device parameters and/or device drivers, as well as control functions and/or setting-up functions and/or diagnosis functions and/or maintenance functions and/or optimization functions and/or alarm processing functions and/or life functions for integration of the field devices in the distributed system.

Device-specific functionalities and/or information for the functional units in the arrangement according to the invention which is stored in a memory medium are/is provided and installed in a higher-level control system or controller which, in particular, is a process control system or a programmable logic controller, relating to the distributed system for the field devices, in an advantageous manner by means of a single automatically running installation process.

Alternatively, the installation of the arrangement according to the invention which is stored in the memory medium is provided by each processor unit/computer unit which is connected to the distributed system.

In one advantageous development, the arrangement according to the invention is extended by configuration tools for installation of the communication between the field devices and/or with the higher-level control system or controller, in particular for the configuration and setting up of the field devices. Means are therefore available which carry out efficient and optimized configuration of the field devices in the distributed system.

In a further advantageous development, the arrangement according to the invention has network components, for example for linking devices (couplers) and remote input/output units for the FOUNDATION fieldbus, the PROFIBUS or the PROFINet, for installation of the network links for a specific communication architecture.

By way of example, the network components have information and/or functionalities for specific bus protocols such as HART (Highway Addressable Remote Transmitter), PROFIBUS, PROFINet, FOUNDATION fieldbus. The information and/or the functionalities can thus be installed separately for specific bus protocols, or alternatively can be installed at the same in order to form a heterogeneous communication system.

The configuration tools and/or network components can be installed in the same manner as the device-specific components in an installation process by the higher-level control system or controller for the field devices.

In an alternative embodiment, selective installation is also provided for the device-specific components, for the configuration tools and for the network components for the field devices, which are stored in the arrangement according to the invention.

The arrangement according to the invention is advantageously designed such that means are provided in the device-specific components for testing the correctness and/or completeness of the device-specific functionalities and/or information.

The provisions on the device-specific components can advantageously be extended or reduced in one method step by at least one further device-specific functionality and/or information item or items.

A computer program for carrying out the arrangement according to the invention on an appropriately configured data processing device, in particular the higher-level control system or controller, which has the features of the method according to the invention leads to one preferred embodiment of the arrangement according to the invention. A computer program, in particular a computer program which is stored in a data storage medium, and which has the features of the method according to the invention is thus expressly included in the disclosure content of the present application.

Since the functionalities are combined on a device-specific basis in the arrangement according to the invention, this results in a simplified, clear structure for provision and installation in the distributed systems, which are in particular in the form of fieldbus systems.

The method by means of which the object is also achieved can be found in claim 17. Device-specific functionalities and/or information for the field devices are/is thus provided and installed automatically by means of at least one device-specific component, which interacts with at least two functional units which are linked to it.

The method according to the invention efficiently assists and simplifies the provision and installation of device-specific functionalities and/or information for the field devices in a distributed system, as well as considerably reducing the procedures involved, in particular during setting up.

The invention as well as advantageous refinements, improvements and further advantages of the invention will be explained and described in more detail with reference to exemplary embodiments which are illustrated in the drawing FIGS. 1 to 4, in which:

DETAILED DESCRIPTION

Figure 1:
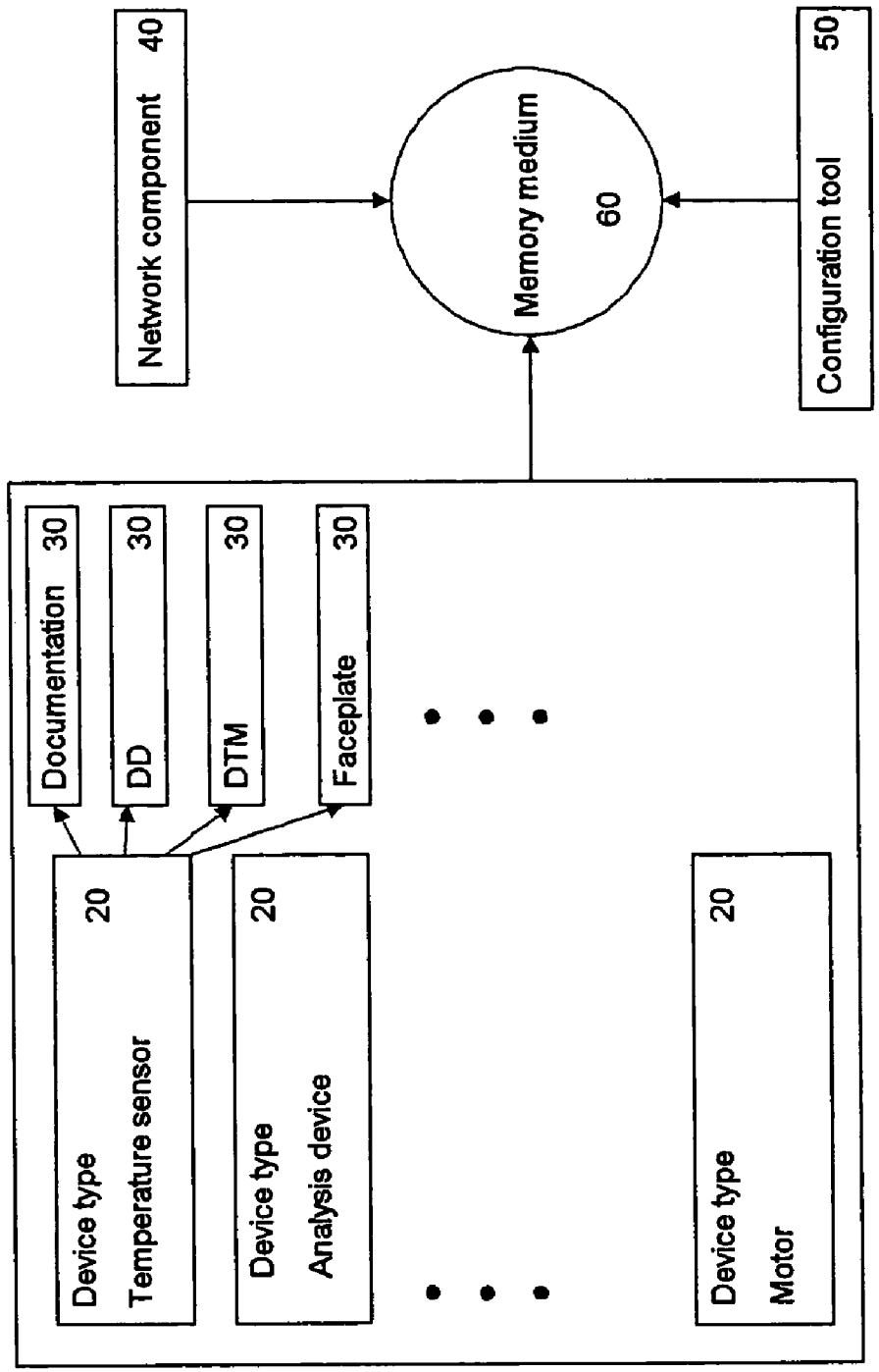
FIG. 1 shows one exemplary embodiment of the arrangement according to the invention for directed provision and installation of device-specific functionalities and/or information for field devices which are arranged in a distributed system.

FIG. 1 shows one exemplary embodiment of the arrangement according to the invention for directed provision and installation of device-specific functionalities and/or information for field devices which are arranged in a distributed system and comprise a plurality of device-specific components 20.

The device-specific components 20 relate in particular to device-specific information for drives, switchgear assemblies, instrumentation for positioning states, pressure, temperature and/or flow rate measurements, and low-voltage switching devices, as well as functionalities of the field devices over the entire life cycle of the devices for planning and configuration, for setting up, for operation, for diagnosis displays, for linking to maintenance management and for real-time displays for alarm, status and/or event messages, in particular for asset management (installation management).

The device-specific components 20 for this purpose interact with at least two functional units 30 which are linked to them, with the functional units 30 being used to store device information, such as device documentation and/or device core data and/or device parameters and/or device drivers, as well as control functions and/or setting-up functions and/or diagnosis functions and/or maintenance functions and/or optimization functions and/or alarm processing functions and/or life functions for integration of the field devices in the distributed system.

The device-specific components 20 also have means, such as device descriptions or drivers, which automatically provide and install device-specific functionalities and/or information for the field devices, which are stored in the functional units 30.

The device-specific functionalities and/or information which are/is stored in the arrangement according to the invention are/is recorded as data structures and/or program components in the device-specific components 20, such that each component has only functionalities and/or information for the device type associated with it.

The device-specific components 20 are extended such that it is possible to test the correctness and/or completeness of the device-specific functionalities and/or information.

The arrangement according to the invention can be extended by at least one configuration tool 50, for example by a setting-up component, which assists the installation of the communication between the field devices and/or with the higher-level control system or controller.

Furthermore, network components 40 are integrated in the arrangement according to the invention, such as a component for a linking device, for installation of the network links for a specific communication architecture.

For installation that takes place automatically, the arrangement according to the invention is stored with the functionalities and/or information which are/is stored in the device-specific components 20, the network information which is stored in the network components 40, and the configuration instructions which are stored in the configuration tools 50, in a memory medium 60 which can be transmitted to the field devices via the distributed system by means of a processor unit/computer unit in the higher-level control system or controller.

The installation of the arrangement according to the invention which is stored in the memory medium 60 can optionally be carried out with the device-specific functionalities and/or information which are/is stored in the device-specific components 20, the network information which is stored in the network components 40 and the configuration instructions which are stored in the configuration tools 50, by each processor unit/computer unit which is connected to the distributed system.

Figure 2:
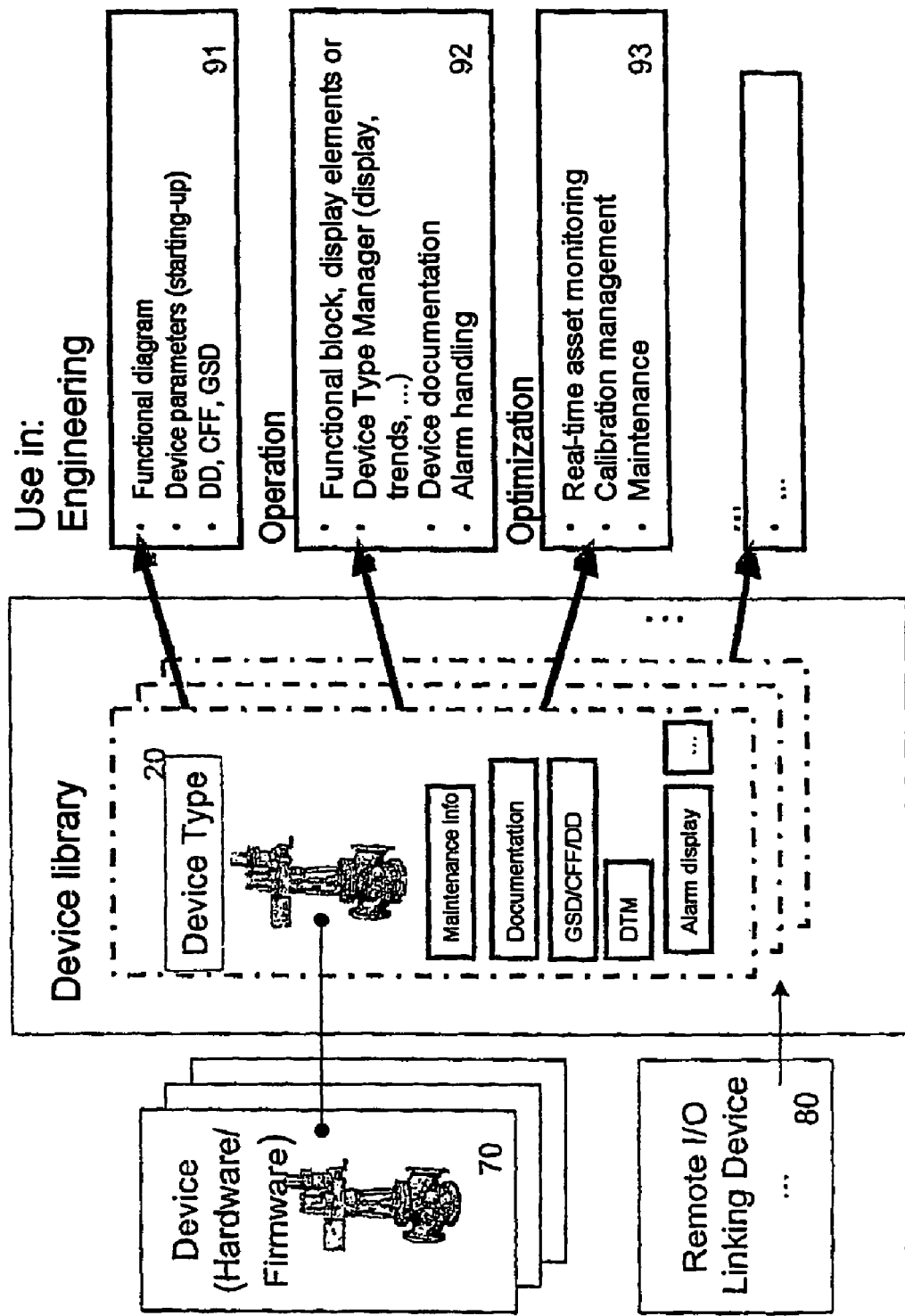
FIG. 2 shows an example of the integration of the device-specific functionalities and/or information for a field device, and the use of the device-specific functionalities and/or information in the distributed system.

FIG. 2 shows an example of the integration of the device-specific functionalities and/or information for a field device 70, for example a drive, a motor protection unit, a switchgear assembly, a sensor, in particular a sensor for pressure, temperature and flow rate measurements, a low-voltage device, an actuator or an analysis device, and the use of the device-specific functionalities and/or information in the distributed system.

The field device 70 which is used in the distributed system is normally equipped with firmware by the device manufacturer. However, further device-specific functionalities and/or information, such as device documentation, device drivers, device core data, device parameters, control functions, setting-up functions, diagnosis functions, maintenance functions, optimization functions, alarm processing functions and life functions, are required for integration of the field device 70 in the distributed system. These device-specific functionalities and/or information are/is stored in the functional units 30 of the corresponding device-specific components 20, is or are made available by the arrangement according to the invention, and is or are transmitted to the distributed system.

For integration of the remote I/O and linking devices 80 in the distributed system, the arrangement according to the invention is extended by network components 40 in which the information and functionalities are stored for installation of the network links for a specific communication architecture, for example for the FOUNDATION fieldbus and/or the PROFIBUS, and/or the PROFINet and/or the HART.

The device-specific functionalities and/or information which are/is stored in the arrangement according to the invention are/is also used in the distributed system, for example in the installation planning 91, in the installation operation 92 and in the installation optimization 93. In this case, installation planning includes in particular functional diagrams, device parameters for setting up and/or device description files, and/or device drivers and/or device core data files. Installation operation includes display elements, device managers for the display and/or the trend profile, device documentation and/or alarm actions or processing operations. The optimization functionality addresses the maintenance, calibration management and/or real-time monitoring of the installation and of installation components.

Figure 3:
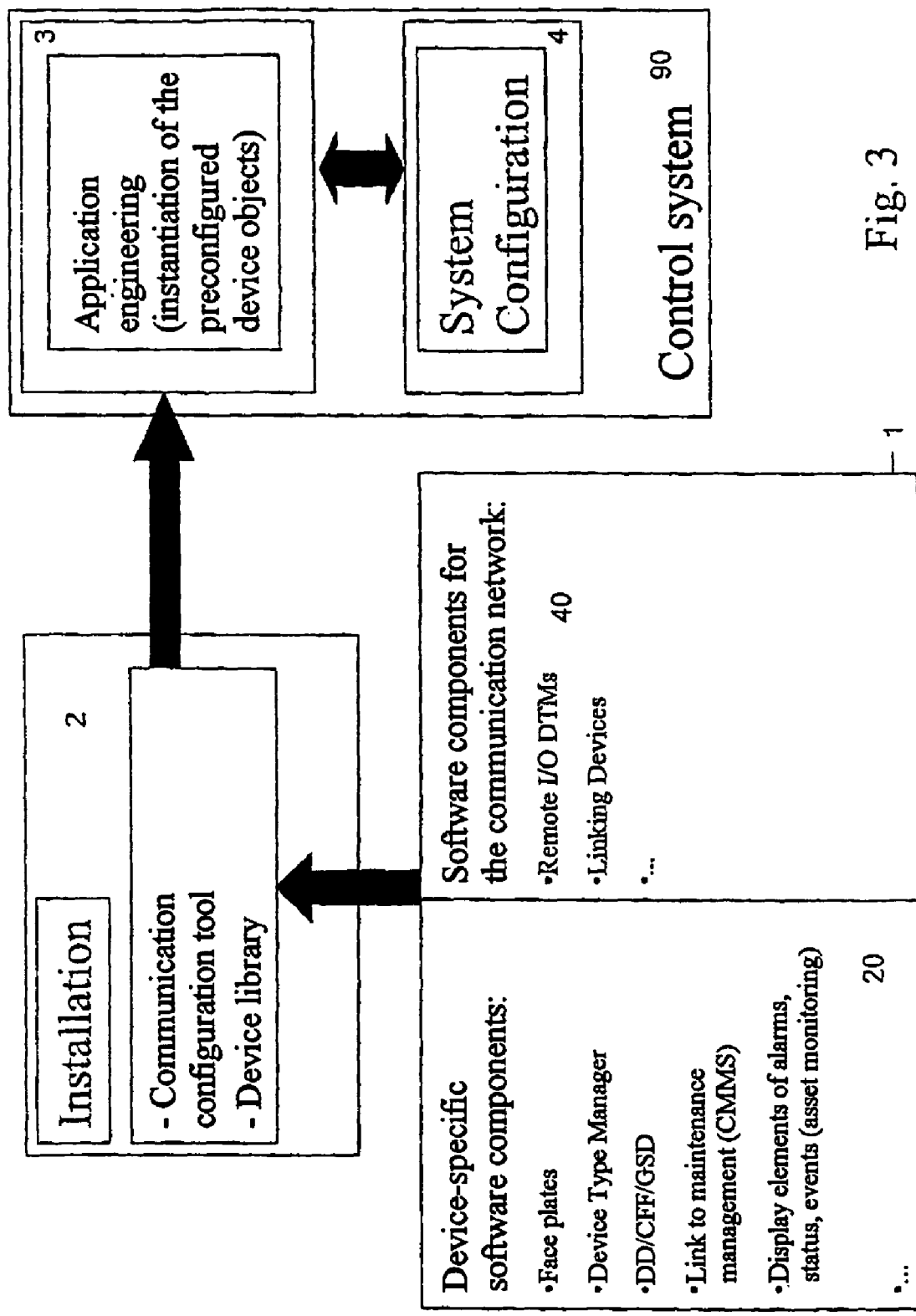
FIG. 3 shows one exemplary embodiment relating to the implementation of the method according to the invention for directed provision and installation of device-specific functionalities and/or information for field devices which are arranged in a distributed system.

FIG. 3 shows one exemplary embodiment relating to the implementation of the method according to the invention for directed provision and installation of device-specific functionalities and/or information for field devices 70 which are arranged in a distributed system.

In a first step 1, the device-specific functionalities and/or information for the device-specific components 20 and the functional units 30 which interact with the device-specific components 20 and are linked to them, as well as the network components 40 with information and functionalities for communication via the distributed network are/is created and stored in a memory medium 60, with a check for correctness and/or completeness being carried out before storage of the device-specific functionalities and/or information.

In a second step 2, the device-specific components 20 which interact with the functional units 30 and the network components 40 carry out an installation process, which takes place automatically, such that the device-specific functionalities and/or information are/is provided and installed in a higher-level control system or controller 90 via the distributed system for the field devices 70, in a single installation process, which takes place automatically.

The network components 40 are provided for installation of the network links for a specific communication architecture, for example for a fieldbus protocol in the form of PROFIBUS and/or PROFINet and/or FOUNDATION fieldbus and/or HART.

Once the functionalities and/or information have/has been successfully installed in the higher-level control system or controller 90, at least one device-specific component 20 is produced in the higher-level control system or controller 90 in a step 3. The device-specific functionalities and/or information which are/is stored in the functional units 30 are/is provided and installed in a higher-level control system or controller 90, for example by instantiation of previously configured device-specific components 20.

For the installation of the communication between the field devices 70 and/or with the higher-level control system or controller 90, the arrangement according to the invention is extended by configuration tools 50 which, in a fourth step 4, assist the system configuration, in particular the communication with the field devices 70 during the setting up and configuration of the field devices 70.

In an alternative embodiment, the device-specific components 20, the configuration tools 50 and/or the network components 40 can also be installed selectively for the field devices 70.

In one particular embodiment of the method according to the invention, the device-specific components 20 have at least one device-specific component 20 added to them or removed from them by means of a program approach in a further step.

Figure 4:
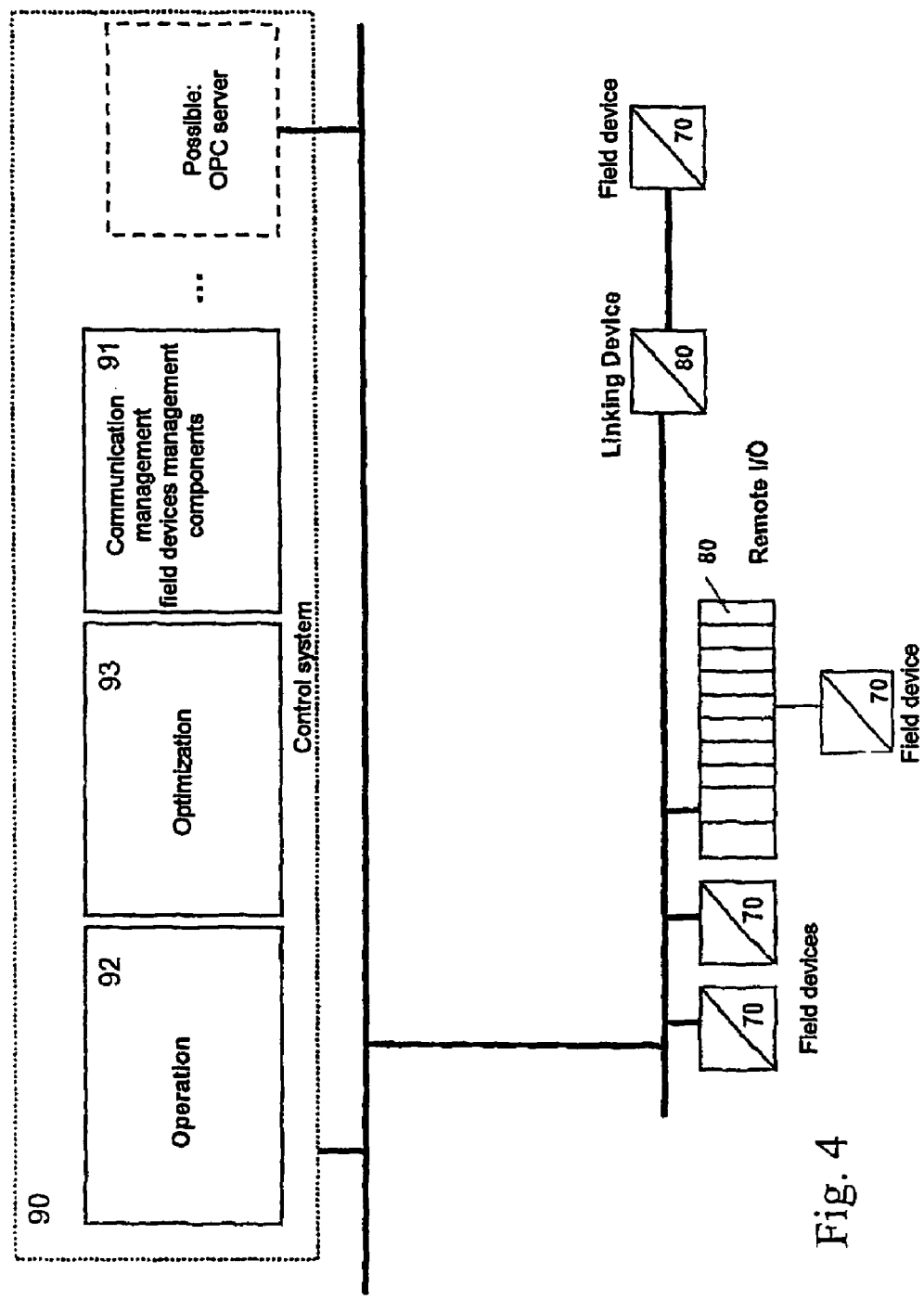
FIG. 4 shows one exemplary embodiment of the arrangement of the field devices in a distributed system.

FIG. 4 shows one exemplary embodiment of the arrangement of the field devices 70 in a distributed system, in which the higher-level control system 90 is, for example, a process control system or a programmable logic controller, and communicates with the field devices 70 via linking devices 80 and remote I/O 80.

The invention claimed is:

1. A system for controlling a distributed system comprising:
   an arrangement of plural field devices, wherein each field device is associated with a device-specific component and at least one functional unit;

memory that stores device-specific data of each device-specific component and the at least one functional unit; and a controller that communicates with the memory to acquire and install the device specific data, wherein the controller includes means for interacting with each field device based on the installed device specific data.

2. The system as claimed in claim 1, wherein at least one of the device-specific functionalities and information that is stored in the functional units is installed by means of an automatically running installation process.

3. The system as claimed in claim 1, further comprising:
configuration means for installing a communication link between at least one of the field devices and with the controller.

4. The system as claimed in claim 1, further comprising:
network components for installation of the network links for a specific communication architecture.

5. The system as claimed in claim 1, wherein the functional units are at least one of device documentation, device core data, device parameters, device drivers, control functions, setting-up functions, diagnosis functions, maintenance functions, optimization functions, alarm processing functions, and life functions.

6. The system as claimed in claim 5, wherein at least one of the device-specific components, at least one configuration tool, and at least one network component are installed selectively.

7. The system as claimed in claim 1, wherein at least one of drives, motor protection units, switchgear assemblies, sensors, in particular sensors for pressure, temperature and flow rate measurements, low voltage devices, actuators, and analysis devices are used as field devices.

8. The system as claimed in claim 1, wherein at least one of the device-specific functionalities and information is recorded as at least one of data structures and program components in the memory.

9. The system as claimed in claim 1, wherein the memory is configured to test each device-specific components for at least one of correctness and completeness of at least one of the device-specific functionalities and information.

10. The system as claimed in claim 1, wherein the device-specific components can be extended in a modular form.

11. The system as claimed in claim 1, wherein the distributed system is a distributed automation system.

12. The system as claimed in claim 1, wherein the higher-level system is a process control system or a programmable logic controller.

13. The system as claimed in claim 1, wherein the field devices communicate with the higher-level control system or controller via a fieldbus protocol which is in the form of at least one of PROFIBUS, PROFINet, FOUNDATION fieldbus, and HART.

14. A method for configuring a distributed system, wherein the distributed system includes memory, an arrangement of field devices, and a controller, the method comprising:
storing device-specific data in the memory;
installing the device-specific data in the controller; and
producing, at the controller, device-specific components for the arrangement of field devices based on the installed device specific data.

15. The method as claimed in claim 14, wherein the device-specific data includes at least one of device-specific functionalities and information each device-specific component and associated functional units is installed by means of an automatically running installation process.

16. The method as claimed in claim 14, further comprising:
installing a communication link between at least one of the field devices and with the controller.

17. The method as claimed in claim 14, further comprising:
installing network links for a specific communication architecture.

18. The method as claimed in claim 14, wherein the functional units provide at least one of device documentation, device core data, device parameters, device drivers, control functions, setting-up functions, diagnosis functions, maintenance functions, optimization functions, alarm processing functions, and life functions.

19. The method as claimed in claim 14, wherein at least one of the device-specific components, at least one configuration tool, and at least one network component are installed in an installation process.

20. The method as claimed in claim 14, wherein at least one of the device-specific components, at least one configuration tool, and at least one network component are installed selectively.

21. The method as claimed in claim 14, wherein at least one of drives, motor protection units, switchgear assemblies, sensors, in particular sensors for pressure, temperature and flow rate measurements, low voltage devices, actuators and analysis devices are used as field devices.

22. The method as claimed in claim 14, wherein the device specific data includes at least one of device-specific functionalities and information, the method further comprising:
storing the at least one of device-specific functionalities and information as at least one of data structures and program components.

23. The method as claimed in claim 14, further comprising:
testing the device-specific data for at least one of correctness and completeness.

24. The method as claimed in claim 14, further comprising:
providing modular extensions in the device-specific components.

25. The method as claimed in claim 14, wherein the distributed system is in the form of a distributed automation system.

26. The method as claimed in claim 14, wherein the higher-level system is in the form of a process control system or a programmable logic controller.

27. The method as claimed in claim 14, wherein the field devices communicate with a higher-level control system or controller via a fieldbus protocol which is in the form of at least one of PROFIBUS, PROFINet, FOUNDATION fieldbus, and HART.

28. The method as claimed in claim 14, wherein the distributed system also includes a network component and plural functional units, the method further comprising:
installing, in the controller, the device-specific data based on an interaction between the at least one device specific component, at least two functional units, and the network component; and
checking, at the controller, the device-specific functionalities and information for the device-specific components for completeness.

29. The method of claim 14, wherein the step of installing the device-specific data is performed once, the method further comprising:
generating, in the controller, means for interacting with each field device in the arrangement based on the installed device-specific data.

* * * * *